United States Patent
Holtmanns et al.

(10) Patent No.: US 11,985,111 B2
(45) Date of Patent: May 14, 2024

(54) METHOD FOR MESSAGE FILTERING IN AN EDGE NODE BASED ON DATA ANALYTICS

(71) Applicant: Nokia Technologies Oy, Espoo (FI)

(72) Inventors: Silke Holtmanns, Klaukkala (FI); Yoan Jean Claude Miche, Klaukkala (FI); Nagendra S Bykampadi, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 766 days.

(21) Appl. No.: 17/056,606

(22) PCT Filed: May 20, 2019

(86) PCT No.: PCT/EP2019/062900
§ 371 (c)(1),
(2) Date: Nov. 18, 2020

(87) PCT Pub. No.: WO2019/228832
PCT Pub. Date: Dec. 5, 2019

(65) Prior Publication Data
US 2021/0377212 A1 Dec. 2, 2021

(30) Foreign Application Priority Data
Jun. 1, 2018 (IN) .............................. 201841020628

(51) Int. Cl.
*H04L 9/40* (2022.01)
(52) U.S. Cl.
CPC ............ *H04L 63/029* (2013.01); *H04L 63/08* (2013.01); *H04L 63/102* (2013.01)
(58) Field of Classification Search
None
See application file for complete search history.

(56) References Cited

U.S. PATENT DOCUMENTS

2005/0114704 A1* 5/2005 Swander ............. H04L 63/0263
713/153
2008/0201411 A1* 8/2008 Paritosh ................ H04L 51/212
709/203

FOREIGN PATENT DOCUMENTS

| CN | 1820452 A | 8/2006 |
| CN | 101188612 A | 5/2008 |

(Continued)

OTHER PUBLICATIONS

Office action received for corresponding Chinese Patent Application No. 201980036348.7, dated Feb. 15, 2023, 9 pages of office action and no page of translation available.

(Continued)

*Primary Examiner* — Beemnet W Dada
*Assistant Examiner* — Hassan Saadoun
(74) *Attorney, Agent, or Firm* — Nokia Technologies Oy (57) ABSTRACT

According to an example aspect of the present invention, there is provided an apparatus comprising a receiver configured to receive a message from a first security zone, distinct from the one where the apparatus is comprised in, and at least one processing core configured to determine whether to apply a recovery action to the message, the determination comprising a first verification, based on first criteria, to assess whether to apply the recovery action outright, and only in case the first verification does not result in the assessment to apply the recovery action outright, a second verification, based on second criteria, to generate a first weight and a third verification, based on third criteria, to generate a second weight, and to compare a sum of the first weight and the second weight to a predefined trigger to perform the determination.

20 Claims, 6 Drawing Sheets

(56) References Cited

FOREIGN PATENT DOCUMENTS

| CN | 103198123 A | 7/2013 | | |
|---|---|---|---|---|
| CN | 105323261 A | 2/2016 | | |
| CN | 106815085 A | 6/2017 | | |
| CN | 107079007 A | 8/2017 | | |
| CN | 107534555 A | 1/2018 | | |
| EP | 2442525 A1 | 4/2012 | | |
| EP | 3065376 A1 | 9/2016 | | |
| WO | 2004/070509 A2 | 8/2004 | | |
| WO | WO-2004070509 A2 * | 8/2004 | ......... | H04L 63/0236 |

OTHER PUBLICATIONS

"3rd Generation Partnership Project; Technical Specification Group Services and System Aspects; Security architecture and procedures for 5G system (Release 15)", 3GPP TS 33.501, V15.0.0, Mar. 2018, pp. 1-128.

International Search Report and Written Opinion received for corresponding Patent Cooperation Treaty Application No. PCT/EP2019/062900, dated Jul. 11, 2019, 11 pages.

Office action received for corresponding Chinese Patent Application No. 201980036348.7, dated Aug. 12, 2022, 9 pages of office action and no page of translation available.

\* cited by examiner

METHOD FOR MESSAGE FILTERING IN AN EDGE NODE BASED ON DATA ANALYTICS

RELATED APPLICATION

This application was originally filed as PCT Application No. PCT/EP2019/062900, filed on May 20, 2019, which claims priority from Indian Application No. 201841020628, filed on Jun. 1, 2018, each of which is incorporated herein by reference in its entirety.

FIELD

The present disclosure relates to the field of communication between two security zones.

BACKGROUND

Communication networks, such as, for example, mobile communication networks or wire-line networks, connect with each other using interconnection networks. Such interconnection networks may comprise parties who are malicious or, at least, curious concerning data transmitted over the interconnection network and/or into the communication networks.

To secure information in communication networks, operators may deploy firewalls, such as signalling firewalls or internet protocol, IP, firewalls. Furthermore, information communicated over the interconnection networks may be encrypted, integrity protected, authorized and authenticated to protect such information against theft or corruption.

SUMMARY OF THE INVENTION

The invention is defined by the features of the independent claims. Some specific embodiments are defined in the dependent claims.

According to a first aspect of the present invention, there is provided an apparatus comprising a receiver configured to receive a message from a first security zone, distinct from the one where the apparatus is comprised in, and at least one processing core configured to determine whether to apply a recovery action to the message, the determination comprising a first verification, based on first criteria, to assess whether to apply the recovery action outright, and only in case the first verification does not result in the assessment to apply the recovery action outright, a second verification, based on second criteria, to generate a first weight and a third verification, based on third criteria, to generate a second weight, and to compare a sum of the first weight and the second weight to a predefined trigger to perform the determination.

Various embodiments of the first aspect, referred to below as clause 1, may comprise at least one clause from the following bulleted list:
  Clause 2. The apparatus according to clause 1, wherein the at least one processing core is further configured to, in case the sum of the first weight and the second weight fulfils a predefined first condition, perform a fourth verification, based on fourth criteria, to generate a third weight, and to compare a sum of the first weight, the second weight and the third weight to a second threshold to perform the determination.
  Clause 3. The apparatus according to clause 2, wherein the at least one processing core is further configured to, in case the sum of the first weight, the second weight and the third weight fulfils a predefined second condition, perform a fifth verification, based on fifth criteria, to generate a fourth weight, and to compare a sum of the first weight, the second weight, the third weight and the fourth weight to a third threshold to perform the determination.
  Clause 4. The apparatus according to any of clauses 1-3, wherein the apparatus is an edge node.
  Clause 5. The apparatus according to clause 4, wherein the edge node comprises a security edge protection proxy in a 5G service based architecture.
  Clause 6. The apparatus according to any of clauses 1-5, wherein the determination is based, at least in part, on a machine learning process.
  Clause 7. The apparatus according to clause 6, wherein the machine learning process comprises a clustering process.
  Clause 8. The apparatus according to any of clauses 1-7, wherein the recovery action comprises at least one of the following: dropping the message, dropping parts of the message, performing an anti-virus scan on the message, flagging the message to an administrator and modifying a second message, which is transmitted in response to the message.
  Clause 9. The apparatus according to any of clauses 1-8, wherein the first criteria comprise at least one of the following: whether the message originates from a forbidden node, whether the message is of a forbidden type, whether a last-leg security failure occurs and a subscriber class of the message being linked with a first recovery action.
  Clause 10. The apparatus according to any of clauses 1-9, wherein the second criteria comprise at least one of the following: an operator-specific score and an attack history from the first security zone.
  Clause 11. The apparatus according to any of clauses 1-10, wherein the third criteria comprise at least one of the following: a format of the message, a length of the message, a syntax error in the message, whether an internet protocol address in the message is unknown to the apparatus, whether the message comprises information elements, attributes or extensions rarely seen in the apparatus and presence of common vulnerability and exposure, CVE, content in the message.
  Clause 12. The apparatus according to clause 2, wherein the fourth criteria comprise at least one criterion relating to a route taken by the message.
  Clause 13. The apparatus according to clause 3, wherein the fifth criteria, which relate to an internet protocol layer, comprise criteria relating to at least one of the following: ping or scan results, timing, hosting, lower-layer attacks, packet loss information, response times, border gateway protocol information and common vulnerability and exposure, CVE, content.

According to a second aspect of the present invention, there is provided a method comprising receiving a message from a first security zone, distinct from the one where an apparatus performing the method is comprised in, and determining whether to apply a recovery action to the message, the determination comprising a first verification, based on first criteria, to assess whether to apply the recovery action outright, and only in case the first verification does not result in the assessment to apply the recovery action outright, a second verification, based on second criteria, to generate a first weight and a third verification, based on third criteria, to generate a second weight, and to compare a sum of the first weight and the second weight to a predefined trigger to perform the determination.

Various embodiments of the second aspect, may comprise at least one clause corresponding to a clause from the preceding bulleted list laid out in connection with the first aspect.

According to a third aspect of the present invention, there is provided an apparatus comprising means for receiving a message from a first security zone, distinct from the one where the apparatus is comprised in, means for determining whether to apply a recovery action to the message, the determination comprising: a first verification, based on first criteria, to assess whether to apply the recovery action outright, and only in case the first verification does not result in the assessment to apply the recovery action outright, a second verification, based on second criteria, to generate a first weight and a third verification, based on third criteria, to generate a second weight, and to compare a sum of the first weight and the second weight to a predefined trigger to perform the determination.

According to a fourth aspect of the present invention, there is provided a non-transitory computer readable medium having stored thereon a set of computer readable instructions that, when executed by at least one processor, cause an apparatus to at least receive a message from a first security zone, distinct from the one where the apparatus is comprised in determine whether to apply a recovery action to the message, the determination comprising a first verification, based on first criteria, to assess whether to apply the recovery action outright, and only in case the first verification does not result in the assessment to apply the recovery action outright a second verification, based on second criteria, to generate a first weight and a third verification, based on third criteria, to generate a second weight, and to compare a sum of the first weight and the second weight to a predefined trigger to perform the determination.

According to a fifth aspect of the present invention, there is provided a computer program configured to cause a method in accordance with the second aspect to be performed.

EMBODIMENTS

Embodiments described herein provide a more nuanced handling of messages incoming into a security zone. Compared to a solution where an incoming message is admitted or dropped based on determining if the message matches at least one drop criterion, the described solution enables assessing an overall likelihood the message is malicious or strongly unwanted by combining information from several different parts, or aspects, of the message, and/or circumstances applying to the message. In large communication networks, it is not uncommon that configuration errors occur, the differentiation between a configuration error and an unwanted message is often challenging with a pure black and white approach. A non-malicious dropped and blocked message implies a customer that can not a communicate, and a corresponding revenue loss.

Figure 1:
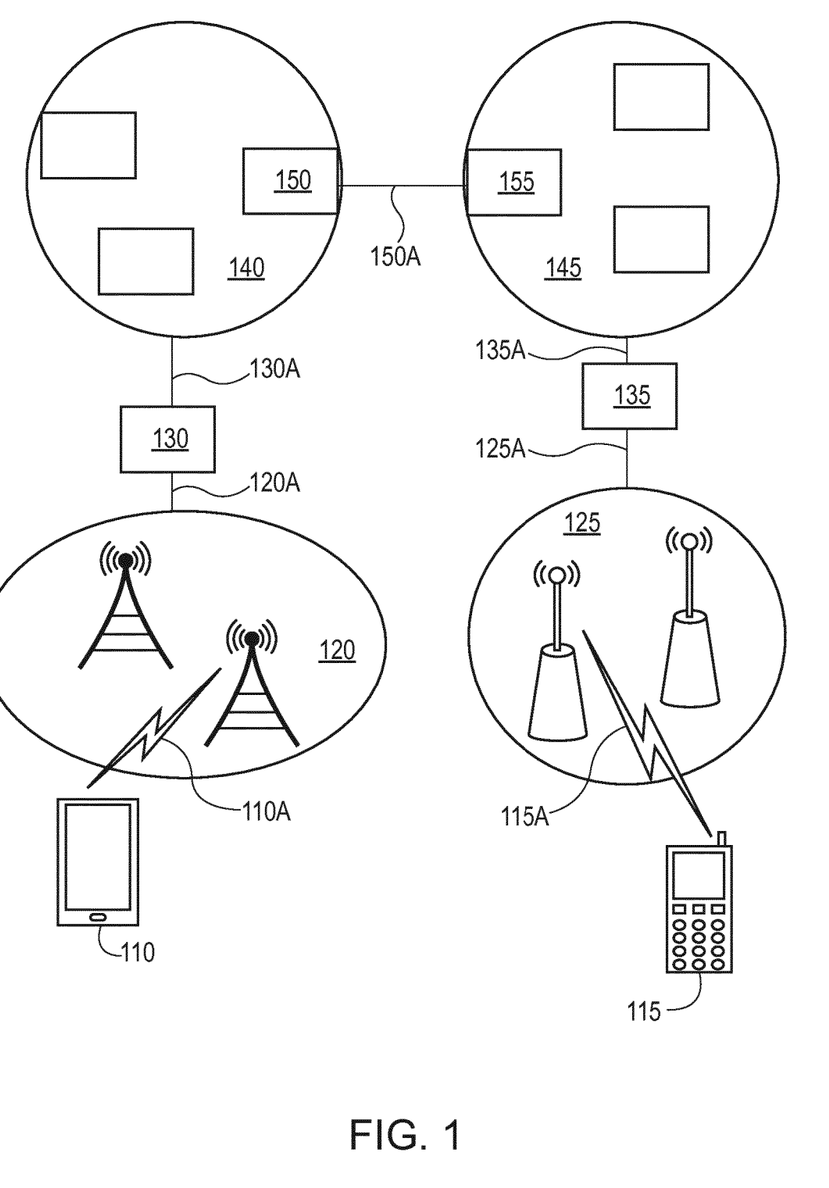
FIG. 1 illustrates an example system in accordance with at least some embodiments.

FIG. 1 illustrates an example system in accordance with at least some embodiments. While this example relates to a cellular context, the invention is not restricted thereto. The system comprises two communication networks, on the left-hand side is a network comprising a radio-access network 120 and core network 140, and on the right-hand side a network comprising radio-access network 125 and core network 145.

In general, a core network may be seen as a security zone. Alternatively, a combination of a core network with a radio-access network may be seen as a security zone, or a security zone may be an application related zone, for example third party services. A security zone may be seen as a network or network segment where a specific set of security configurations is applied. In other words, an entire network may form one security zone where the same security configurations are applied throughout the network. On the other hand, one network may be subdivided two or more security zones by applying two or more different security configurations in areas of the network. Typically, a message arriving from a network of another network operator, for example from an interconnection network, will be a message arriving from another security zone.

To enable communication between terminals 110 and 115, inter-network communication is configured as will be described herein. Terminal 110, which may comprise a cellular telephone, a smartphone, a tablet computer, a laptop computer, connected IoT device, connected car or another suitable terminal device, is configured to communicate with a base station which is comprised in radio access network 120. This communication takes place, in FIG. 1, over a wireless link 110A, which may comprise an uplink for conveying information from terminal 110 to the base station, and a downlink for conveying information from the base station to terminal 110. The base station, terminal 110 and wireless link 110A may be arranged to operate in accordance with a wireless communication standard, such as, for example, with fifth generation, 5G, also known as new radio, NR, with long term evolution, LTE, or with universal mobile telecommunications system, UMTS, or global system for mobile communications, GSM. A further option is worldwide interoperability for microwave access, WiMAX. Alternatively or in addition to a wireless standard, a wire-line communication standard may be employed, such as Ethernet, for example. In case a wire-line communication standard is employed, communication link 110A is not wireless, but wire-line. Wireless link 115 may likewise connect terminal 115 with radio access network 125.

Radio access network 120 and/or 125 may comprise base stations of a single communication technology, or base stations of a mix of communication technologies. In some technologies, the expression "access point" may be used, but in the present disclosure the expression "base station" will be used throughout to streamline terminology. Radio access network 120 is interfaced with radio access network controller 130 via interface 120A. Radio access network 122 is interfaced with radio access network controller 135 via interface 125A.

Radio access network controllers 130 and 135 may be configured to manage the operation of radio access networks. Depending on the technology used, the radio access network controllers may be known as base station controllers, radio network controllers or cloud RAN nodes, for example. In some technologies, radio access network controllers 130 and/or 135 may be absent, with radio access networks being directly interfaced with core networks. In some technologies, radio access network controllers may be classified as being comprised in radio access networks.

Radio access network controller 130 is interfaced with core network 140 via interface 130A. Radio access network controller 135 is interfaced with core network 145 via interface 135A. Core networks may be tasked with network-wide functions, such as switching, subscriber management, authentication and/or billing, for example.

Core network 140 comprises edge node 150, which is tasked with communicating with other networks, such as core network 145, for example. Likewise, core network 145 comprises edge node 155, which is tasked with communicating with other networks, such as core network 140. Thus to connect terminals 110 and 115 with each other, edge nodes 150 and 155 may communicate with each other to convey the information which is to be communicated between these terminals. The edge nodes may communicate over interface 150A, which represents an interconnection network. Thus a message from terminal 110, directed to terminal 115, may traverse wireless link 110A, radio access network 120, interface 120A, radio access network controller 130, interface 130A, core network 140, including edge node 150, interface 150A, core network 145 including edge node 155, interface 135A, radio access network controller 135, interface 125A, radio access network 120 and wireless link 115A.

Edge nodes may be known, depending on the embodiment and an applicable technology, as a security edge protection proxy, SEPP, a gateway GPRS support node, GGSN, or by another name. GPRS is an acronym for general packet radio service. An embodiment may also be implemented as part of a Diameter Edge Agent or diameter routing agent or, for older networks, in a signalling transfer point. In general, edge nodes may be responsible for implementing protection of protocol messages traversing through them before being sent over an interconnection network to another network. While embodiments described herein are predominantly described in terms of edge nodes, the logic of the embodiments may be performed in another node, which the edge node sends messages to for consideration.

The edge nodes may be instructed to communicate with each other based on operator agreements, for example. In principle, communication between the edge nodes could be secured using a symmetric encryption algorithm and encryption keys which are distributed to the edge nodes using a secure out of band method. Examples of symmetric encryption algorithms include advanced encryption standard, AES, 3DES and Blowfish, for example. Alternatively, or indeed in addition, a public-key based encryption system can be employed to obtain interoperation between a large number of networks.

Mobile communication networks face frequent attacks, and need to take decisions as to whether incoming messages are to be admitted or no. Dropping a message is an alternative to admitting it into the network, wherein a dropped message is deleted without forwarding it onward into the security zone. Admittance decisions may be static and binary at the edge of the network. In other words, messages may be dropped based on pre-coded blacklists and/or whitelists. Such decisions are based on hard decision trees, that is, if a lower layer identity does not match upper layer identity, for example, the message may be dropped. Embodiments laid out herein provide for allowing an accumulated amount of suspiciousness of messages, content and/or different layer information based on observed data exchanged between networks to affect an admittance decision.

Attacks against a network may be difficult to detect. For example, an incoming message may be from a correct IP-address range of a partner network, but from an IP address which has not been used before. Such a message is unusual, but would not trigger dropping in a conventional decision tree. If in addition, a subscriber mobility check is on the edge of what is physically possible, then with conventional systems, the message would be admitted, as both individual events are not separately sufficiently suspicious to cause the message to be dropped.

There are known cases where one operator has requested a large set of user credentials from another operator without even having a roaming contract. If later, strange messages would relate to those users whose credentials were requested, they might not be dropped, as there is no "accumulated" suspiciousness and this would probably not be sufficient reason alone to drop such messages. This accumulated suspiciousness would allow to differentiate misconfigurations from malicious messages, as for an attacker it is difficult to intercept a large amount of correct messages. Likewise, message routes vary and a route traversing a less trusted network may be considered as more suspicious than one which only traverses trusted networks. As such, route information could also be useful in filtering messages for admittance decisions.

Networks have regular updates and evolve, wherefore changes as such in communication parameters between networks are normal. In addition, compromised networks may recover, that is, at some point a node which was compromised by malware may be cleaned up and become once more an acceptable node. With simple blacklisting, there is a risk that such roaming partners are cut off permanently. On the other hand, for example, stealing subscriber keys that do not expire until physical SIM/UICC card replacement may be seen as a permanent taint bound to a particular subscription and related messages to it. Intelligent handling of security threats is therefore called for.

Figure 2:
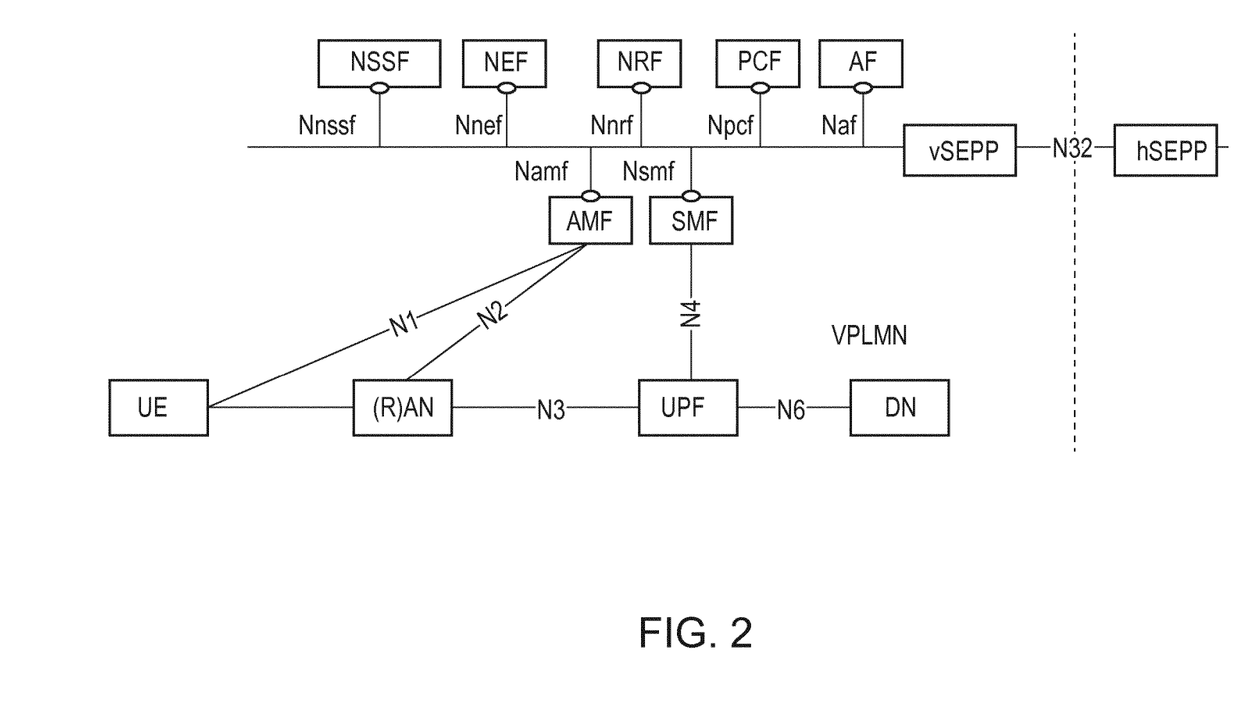
FIG. 2 illustrates a 5G system wherein certain embodiments may be employed.

FIG. 2 illustrates a 5G system wherein certain embodiments may be employed. Here the SEPP is the edge node and the N32 interface corresponds to interface 150A of FIG. 1. The user equipment, UE, is the terminal and (R)AN corresponds to a (radio) access network. Access and Mobility Management Function, AMF, supports NAS functions and connection management. Session Management Function, SMF, supports session management functions such as establishment and release. User Plane Function, UPF, supports packet routing, quality-of-service and interconnects to data networks, DN. A similar system is possible for 4G with the S6a interface and the MME/HSS for example.

Network Slice Selection Function, NSSF, supports selecting network slices to serve a user equipment. Network Exposure Function, NEF, supports exposure of capabilities and secure provision of information from external networks, for example. NF Repository Function, NRF, performs a service discovery function. A Policy Control Function, PCF, provides policy rules to functions. Application Functions, AF, supports interactions with policy control and performs application influence on traffic routing.

In the architecture of FIG. 2, for 5G SBA, the SEPP is an edge node that sits at the perimeter of the network and protects the network from incoming messages. This disclosure focuses on the SEPP, but in general, the invention is for a functionality in or at a node in a communication network sitting on the edge of a security zone, or more generally in the security zone. This may apply to internal security zoning and in-between firewalls, for example. The screening function can be integral part of a SEPP or an associated function, wherein, for example, a copy of the traffic goes to the SEPP and the SEPP receives handling information.

Protocols used in applicable parts of the networks illustrated in FIG. 1, FIG. 2, or both, may comprise, for example, 5G HTTP, TLS, REST API, Jason, 4G diameter, GTP, SIP, SS7 and Sigtran.

During the decoding of the received message, the edge node may interwork with a firewall functionality and, furthermore, request handling of the message, for example to discard the message. The edge node may be configured to log certain events, amounting to generating metadata.

A multi-level risk scoring mechanism may be applied to enable taking into account diverse information in performing the admittance decision concerning an incoming message. The multi-level risk scoring mechanism may comprise a first level, where a direct decision on the message may be taken based on at least one first-level criterion, and at least two further levels. The message may comprise a packet, for example. A packet may comprise an IPv4 or IPV6 addressed packet, for example.

Recovery actions taken concerning a message may comprise, for example, dropping the message, dropping parts of the message, performing an anti-virus scan on the message, flagging the message to an administrator and modifying a second message, which is transmitted in response to the message. The second message may be identified in case the messages are comprised in a same protocol connection, for example. As a further example, a message may be forwarded to a dropped-message archive for storage instead of forwarding it toward its intended recipient. In some embodiments, a recovery action is applied in case an error is detected.

The first level enables taking a recovery action concerning the message directly, without considering further levels. For example, the first level may comprise checking if the message originates from a forbidden node. A forbidden node may comprise a node concerning which there is no valid roaming contract, for example. The first level may comprise checking if the message is of a forbidden type, such as a network-internal message arriving from outside the network. The first level may comprise checking of a security check, such as cryptographic signature verification, fails concerning the message, and/or checking if a subscriber class of the message implies direct dropping or direct admission for the packet. In general, in case the first level enables a decision concerning the message, no other levels need be performed and the message may be handled directly based on the first level. In other words, the first level may comprise a verification, based on first-level criteria, whether a recovery action may be determined to be performed outright.

In case the first level does not result in a decision concerning the message, at least two further levels may be performed. Each level after the first level may output a weight, such as a risk score, and risk scores from at least two such levels may be summed to gauge an overall risk associated with the message. Each level after the first level may comprise a verification based on level-specific criteria. Such criteria are described in the following for second, third, fourth and fifth levels.

A second level may comprise checking operator specific aspects. An example of an operator specific aspect is operator scoring, wherein an operator score may be assigned to an operator from whose security zone the message is incoming. For example, in case the operator has been reported for past fraud, or has been an unreliable partner, or has not implemented security updates, the operator may be assigned a risk score to reflect this. The second level may additionally or alternatively comprise an attack history from the source operator. An attack history may comprise that an entity in the source operator network has stolen information from the security zone where the admittance decision is being taken. An attack history risk score may have an associated aging factor, such that the effect, in terms of risk score, of a theft of information declines in relevance based on the nature of the stolen information. For example, if location information of a terminal is stolen, it may decline in relevance quickly since the terminal will move around naturally, making the stolen information obsolete. Theft of short-term encryption keys or a subscriber profile, on the other hand, may decline in relevance more slowly, and theft of IMSI or permanent cryptographic keys may result in a permanent attack history score which declines in relevance only very slowly, or not at all.

An operator as herein used may refer to a network operator, which is associated with an operator identity which identifies a network. As such, a network operator identity may identify a network rather than an individual user. The operator score may thus be specific to a network, and the operator score may associate a network operator identity with at least one of indications of past fraud, unreliable interactions, and lack of implemented security updates, for example. An example of an operator is a mobile communication network operator. An operator may control a specific security zone.

The operator score and attack history may be considered to be two distinct levels, or two sub-levels of the second level.

A third level may comprise checking message structure related aspects. For example a message format may be unusual, the message may be exceptionally long or exceptionally short, or abnormally ordered. Each of these may result in an increase in risk score assigned in the third level. Likewise, an unknown IP address or global title may result in added risk score. Further, in the third level the presence of unusual information elements, attributes, extensions or proprietary extensions may result in a risk score being assigned to the message. Common vulnerability and exposure, CVE, content may likewise cause a risk score to be accumulated, as may the presence of specific subscriber classes. A message may accumulate risk score from more than one aspect in the third level, the risk scored from each aspect being added together to arrive at an overall third-level risk score for the message.

A fourth level may comprise checking aspects of the message which relate to a route the message has traversed. The route may be present in a header of the message, for example. For example, the fourth level may comprise checking, whether secure legs are comprises in the route, whether intermediate nodes are trustworthy, whether the route is typical for the source network, whether the route is domestic or international, and/or the number of hops. A risk score may be accumulated based on various aspects of the route, accordingly. A risk score contributed by the fourth level may be negative in the sense that it increases the overall reliability of a message. This may be the case, for example, where the message has only traversed highly trusted intermediate hops or nodes along its route.

A fifth level may comprise checking lower-layer aspects relating to the message. For example, Internet protocol layer aspects may be checked. The fifth layer may comprise checking at least one of the following: ping or scan results, timing aspects, hosting aspects, lower-layer attacks, packet loss information, response times, border gateway protocol information and lower layer common vulnerability and exposure, CVE, content. Each such aspect may be configured with a risk score effect, to generate overall a risk score contributed by the fifth level.

For example, in case the first level does not result in a direct decision, the second and third layers may be performed, and their risk scores may be summed together and compared to a predefined trigger to determine, whether a decision can be taken on the message. In case no decision can be taken, the fourth layer may be performed, and its risk score may be added to the sum of risk scores of the second and third levels. This sum of three risk scores may then be compared to a predefined trigger to determine, whether a decision can be taken on the message. In case no decision can be taken, the fifth layer may be performed, and its risk score may be added to the sum of risk scores of the second, third and fourth levels. This final aggregate risk score may then be compared to a threshold to arrive at a decision concerning the message. A default decision may be defined for indeterminate cases.

A predefined trigger may comprise, for example, a dual threshold wherein a risk of less than a first point results in an admittance decision and a risk of more than a second point results in a dropping decision. A risk lying between the first point and the second point may result in a subsequent level being performed to try to arrive at a decision.

Figure 3:
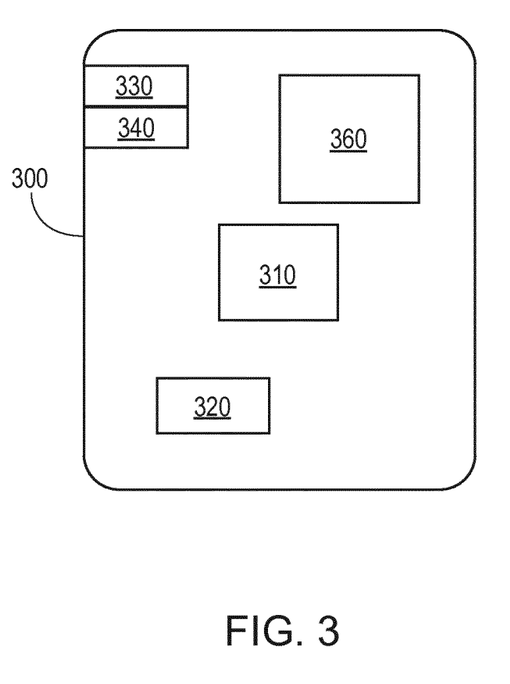
FIG. 3 illustrates an example apparatus capable of supporting at least some embodiments of the present invention.

FIG. 3 illustrates an example apparatus capable of supporting at least some embodiments. Illustrated is device 300, which may comprise, for example, an edge node such as edge node 150 or 155 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Xeon processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as an edge node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with suitable communication standards to enable obtaining the benefits of the present invention.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure an edge node.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera.

Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
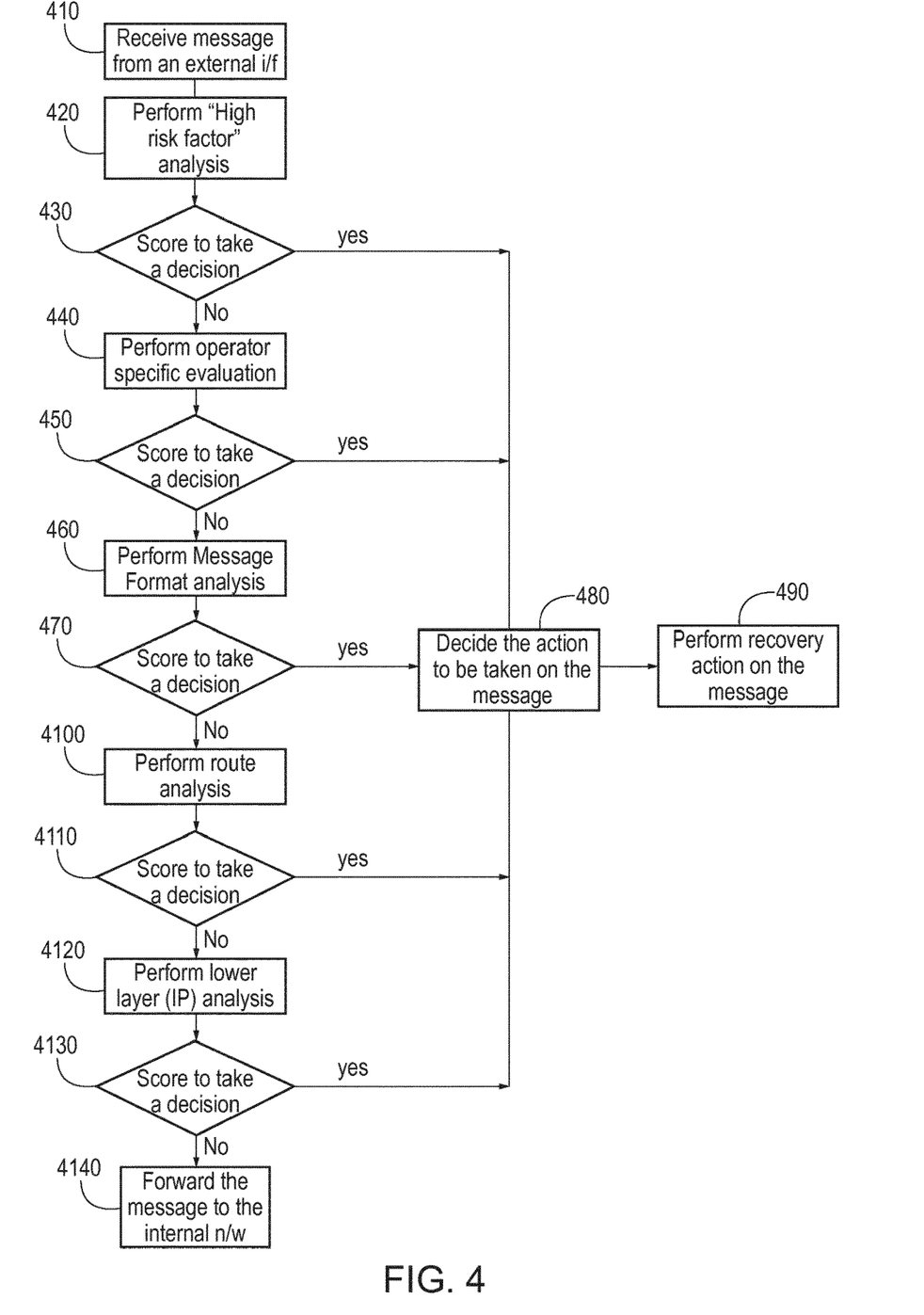
FIG. 4 is a flow chart of a method in accordance with at least some embodiments of the present invention.

FIG. 4 is a flow chart of a method in accordance with at least some embodiments of the present invention. The method may be performed in an edge node, for example. Processing begins at the top with receiving a message from an external interface, i/f, for example from another security zone, in phase 410. In phase 420, the first level is performed, and it is checked, phase 430, whether a direct decision may be taken based on the first level result. In case such a direct decision can be taken, processing advances to phase 480 and if such a decision cannot be taken, processing advances to phase 440, where the second level is performed. A check on a possible decision after the second decision is made in phase 450, and in case no decision can be taken, processing advances to phase 460 where the third level is performed. As discussed above, performing the operator scoring and attack history parts of the second level may be considered two levels as these aspects are not entirely dependent on each other. In phase 470 it is checked, whether the summed weight obtained from the second and third levels enables a decision to be taken on the message. In case this is the case, processing advances to phase 480 where the decision is taken, and to phase 490 where the decision is applied. For example, the message may be dropped, admitted to the network or forwarded to a dropped-message archive for storage.

In case a decision cannot be taken in phase 470, the fourth level is performed, namely route analysis, phase 4100. A risk score obtained from the fourth level is added to those obtained from the second and third levels to determine in phase 4110, if a decision can be taken. If so, the decision is taken as described above, if not processing advances to phase 4120, where the fifth level is performed, namely lower-layer analysis. A decision is attempted in phase 4130, based on the added weights of the second to fifth levels. In FIG. 4, a default decision of admitting the message is present as phase 4140.

Figure 5:
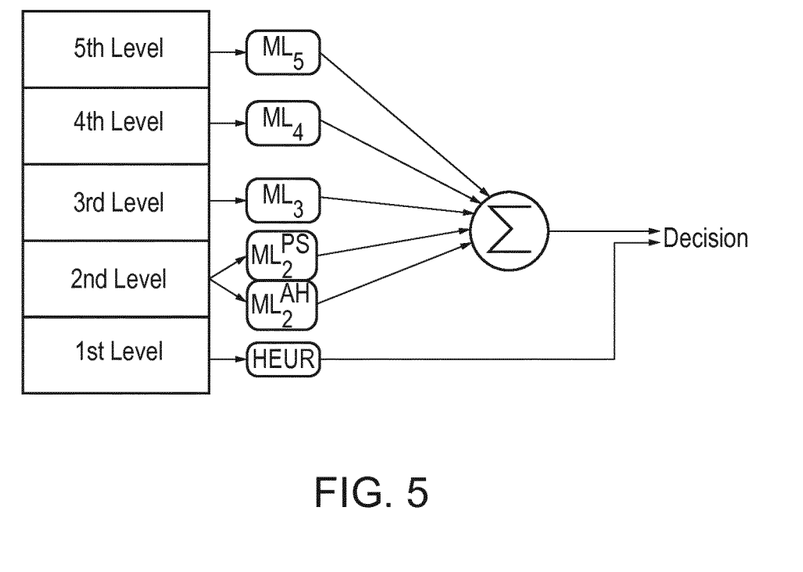
FIG. 5 illustrates aggregation of weights in accordance with at least some embodiments of the present invention.

FIG. 5 illustrates aggregation of weights in accordance with at least some embodiments of the present invention.

The first level may result in a direct decision based on heuristics HEUR, as described herein above. In case the first level does not result in a decision, the second and third levels are performed. In FIG. 5, the second level is subdivided into separate attack history, AH, and partner scoring, PS, parts, but in general these risk scores, ML, may be simply added together inside the second level or in the summation phase, resulting in no difference in operation. Progressively, the fourth and fifth levels are performed, as described herein above, if needed to arrive at a decision.

In some embodiments, the risk score ML may be positive or negative. For example, if a partner score indicates the originating network is very reliable, it may generate a negative risk score which may negate the effect of a risk score contribution from another level. As a specific example, a partner score in the second level may be so good, that the fourth and fifth levels need not be performed, since the sum of risk scores from the second and third levels is sufficiently good to take a decision to admit the message in to the network.

The risk scores, ML, may take the form of machine learning solutions. For example, distance-based machine learning solutions, such as clustering solutions, may be used. In such solutions, a similarity metric may be used in assessing how similar or dissimilar a message is to previously received messages, for example from a specific network operator. A distance from an average admitted message may serve as the risk score, for example. Admitted messages may form more than one cluster in the machine learning similarity space, wherein a risk score may be selected as the distance to a centre of a cluster closest to the message.

In some embodiments, some clusters may comprise dropped messages, which may be the case, for example, where a coordinated phishing attack is ongoing in which the phishing messages are similar to each other. In such a case, closeness to such a cluster may result in a high risk score being assigned.

In general a technical effect is obtained in that the described solution performs levels of message handling only where necessary, and where a decision can be taken based on earlier levels, later levels may be omitted, which provides savings in terms of delay, processor cycles and energy.

Figure 6:
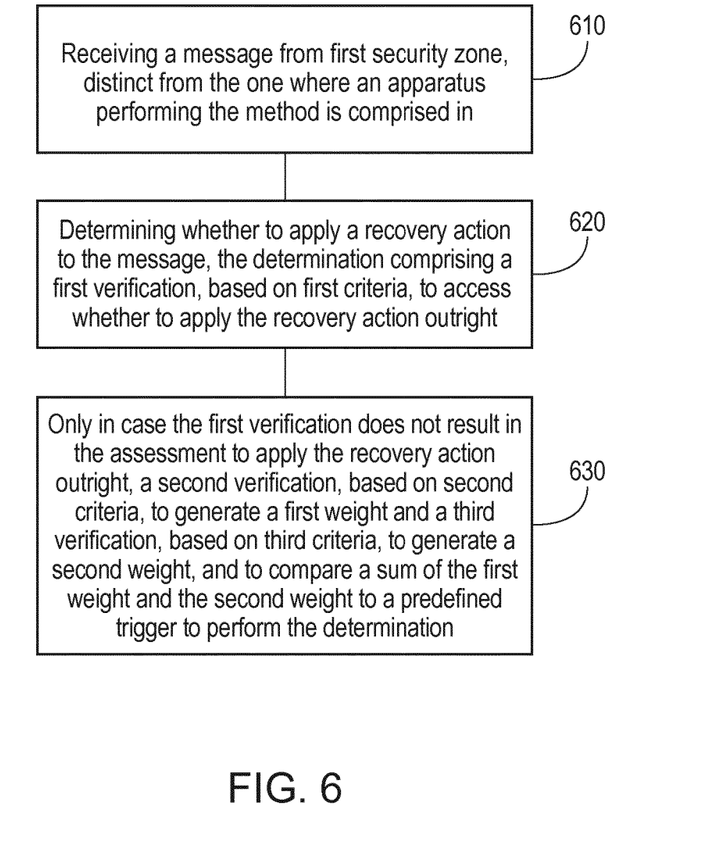
FIG. 6 is a flow chart of a method in accordance with at least some embodiments of the present invention.

FIG. 6 is a flow chart of a method in accordance with at least some embodiments of the present invention. The method may be performed in an edge node, for example, or in a control device configured to control the actions of an edge node, when installed therein.

Phase 610 comprises receiving a message from a first security zone, distinct from the one where an apparatus performing the method is comprised in. Phase 620 comprises determining whether to apply a recovery action to the message, the determination comprising a first verification, based on first criteria, to assess whether to apply the recovery action outright, and only in case the first verification does not result in the assessment to apply the recovery action outright, a second verification, phase 630, based on second criteria, to generate a first weight and a third verification, based on third criteria, to generate a second weight, and to compare a sum of the first weight and the second weight to a predefined trigger to perform the determination.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in handling messages in a network.

ACRONYMS LIST

IMSI International mobile subscriber identity
GGSN gateway GPRS support node
GPRS general packet radio service
GSM global system for mobile communications
GTP GPRS tunnelling protocol
HTTP hypertext transfer protocol
SEPP security edge protection proxy
SIP session initiation protocol
SS7 signalling system no. 7
TLS transport layer security
UMTS universal mobile telecommunications system
WiMAX worldwide interoperability for microwave access

| REFERENCE SIGNS LIST | |
|---|---|
| 110, 115 | Terminal |
| 110A, 115A | Wireless link |
| 120, 125 | Radio access network |
| 130, 135 | Radio access network controller |
| 120A, 125A, 130A, 135A | Interfaces |
| 140, 145 | Core network |
| 150, 155 | Edge node |
| 150A | Interface (interconnection network) |
| 300-360 | Structure of the device of FIG. 3 |
| 410-4140 | Phases of the method of FIG. 4 |
| 610-630 | Phases of the method of FIG. 6 |

We claim:

1. An apparatus comprising:
at least one processing core,
at least one memory including computer program code,
the at least one memory and the computer program code being configured to, with the at least one processing core, cause the apparatus at least to:
receive a message from a first security zone, distinct from the one where the apparatus is comprised in; and
determine whether to apply a recovery action to the message, the determination comprising:
first verification, based on first criteria, to assess whether to apply the recovery action outright, and only in case the first verification does not result in the assessment to apply the recovery action outright,
a second verification, based on second criteria, to generate a first weight and a third verification, based on third criteria, to generate a second weight, and to compare a sum of the first weight and the second weight to a predefined trigger to perform the determination.

2. The apparatus according to claim 1, is further caused to:
in case the sum of the first weight and the second weight fulfils a predefined first condition, perform a fourth verification, based on fourth criteria;
generate a third weight; and
compare a sum of the first weight, the second weight and the third weight to a second threshold to perform the determination.

3. The apparatus according to claim 2, is further caused to:
in case the sum of the first weight, the second weight and the third weight fulfils a predefined second condition, perform a fifth verification, based on fifth criteria;
generate a fourth weight; and
compare a sum of the first weight, the second weight, the third weight and the fourth weight to a third threshold to perform the determination.

4. The apparatus according to claim 1, wherein the apparatus is an edge node.

5. The apparatus according to claim 4, wherein the edge node comprises a security edge protection proxy in a 5G service based architecture.

6. The apparatus according to claim 1, is further caused to determine based, at least in part, on a machine learning process.

7. The apparatus according to claim 6, wherein the machine learning process comprises a clustering process.

8. The apparatus according to claim 1, wherein the recovery action comprises at least one of the following: drop the message, drop parts of the message, perform an anti-virus scan on the message, flag the message to an administrator and modify a second message, which is transmitted in response to the message.

9. The apparatus according to claim 1, wherein the first criteria comprise at least one of the following: whether the message originates from a forbidden node, whether the message is of a forbidden type, whether a last-leg security failure occurs and a subscriber class of the message being linked with a first recovery action.

10. The apparatus according to claim 1, wherein the second criteria comprise at least one of the following: an operator-specific score and an attack history from the first security zone.

11. The apparatus according to claim 1, wherein the third criteria comprise at least one of the following: a format of the message, a length of the message, a syntax error in the message, whether an internet protocol address in the message is unknown to the apparatus, whether the message comprises information elements, attributes or extensions rarely seen in the apparatus and presence of common vulnerability and exposure, CVE, content in the message.

12. The apparatus according to claim 2, wherein the fourth criteria comprise at least one criterion relating to a route taken by the message.

13. The apparatus according to claim 3, wherein the fifth criteria, which relate to an internet protocol layer, comprise criteria relating to at least one of the following: ping or scan results, timing, hosting, lower-layer attacks, packet loss information, response times, border gateway protocol information and common vulnerability and exposure, CVE, content.

14. A method comprising:
receiving a message from a first security zone, distinct from the one where an apparatus performing the method is comprised in, and
determining whether to apply a recovery action to the message, the determination comprising:
a first verification, based on first criteria, to assess whether to apply the recovery action outright, and only in case the first verification does not result in the assessment to apply the recovery action outright,
a second verification, based on second criteria, to generate a first weight and a third verification, based on third criteria, to generate a second weight, and to compare a sum of the first weight and the second weight to a predefined trigger to perform the determination.

15. The method according to claim 14, further comprising, in case the sum of the first weight and the second weight fulfils a predefined first condition, performing a fourth verification, based on fourth criteria, to generate a third weight, and comparing a sum of the first weight, the second weight and the third weight to a second threshold to perform the determination.

16. The method according to claim 15, further comprising, in case the sum of the first weight, the second weight and the third weight fulfils a predefined second condition, performing a fifth verification, based on fifth criteria, to generate a fourth weight, and comparing a sum of the first weight, the second weight, the third weight and the fourth weight to a third threshold to perform the determination.

17. The method according to claim 14, wherein the apparatus is an edge node.

18. The method according to claim 17, wherein the edge node comprises a security edge protection proxy in a 5G service based architecture.

19. The method according to claim 14, wherein the recovery action comprises at least one of the following: dropping the message, dropping parts of the message, performing an anti-virus scan on the message, flagging the message to an administrator and modifying a second message, which is transmitted in response to the message.

20. The method according to claim 14, wherein the first criteria comprise at least one of the following: whether the message originates from a forbidden node, whether the message is of a forbidden type, whether a last-leg security failure occurs and a subscriber class of the message being linked with a first recovery action.

* * * * *